US012122165B2

(12) United States Patent
Shimada

(10) Patent No.: US 12,122,165 B2
(45) Date of Patent: Oct. 22, 2024

(54) INKJET RECORDING APPARATUS AND INK TANK THAT PREVENTS INK DRIPPING WHEN INK IS INJECTED INTO AN INK TANK

(71) Applicant: CANON KABUSHIKI KAISHA, Tokyo (JP)

(72) Inventor: Koki Shimada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/355,244

(22) Filed: Jul. 19, 2023

(65) Prior Publication Data

US 2023/0356531 A1 Nov. 9, 2023

Related U.S. Application Data

(63) Continuation of application No. 17/384,192, filed on Jul. 23, 2021, now Pat. No. 11,745,510, which is a
(Continued)

(30) Foreign Application Priority Data

Apr. 3, 2019 (JP) ................................ 2019-071350

(51) Int. Cl.
*B41J 2/175* (2006.01)
*B41J 29/13* (2006.01)

(52) U.S. Cl.
CPC ....... *B41J 2/17506* (2013.01); *B41J 2/17509* (2013.01); *B41J 2/17513* (2013.01);
(Continued)

(58) Field of Classification Search
CPC .... B41J 2/175; B41J 2/17506; B41J 2/17509; B41J 2/17513; B41J 2/1752;
(Continued)

(56) References Cited

U.S. PATENT DOCUMENTS

2010/0201761 A1* 8/2010 Lu ........................ B41J 2/17509 347/86
2014/0104349 A1* 4/2014 Kimura ................ B41J 2/17553 347/85
(Continued)

FOREIGN PATENT DOCUMENTS

CN 1496842 A 5/2004
CN 103722892 A 4/2014
(Continued)

*Primary Examiner* — Anh T Vo
(74) *Attorney, Agent, or Firm* — CANON U.S.A., INC. IP DIVISION

(57) ABSTRACT

An inkjet recording apparatus includes an ink tank including an ink storage chamber configured to store ink to be supplied to a recording head configured to discharge ink. An injection portion is provided through which ink is injected from an ink bottle into the ink storage chamber. An ink reception portion is configured to receive ink inside the injection portion. A communication portion is configured to communicate with the ink storage chamber inside the injection portion. A guide portion is configured to guide ink received by the ink reception portion to the communication portion.

24 Claims, 15 Drawing Sheets

Related U.S. Application Data continuation of application No. 16/829,651, filed on Mar. 25, 2020, now Pat. No. 11,097,547.

(52) U.S. Cl.
CPC ......... *B41J 2/1752* (2013.01); *B41J 2/17523* (2013.01); *B41J 2/1754* (2013.01); *B41J 2/17553* (2013.01); *B41J 29/13* (2013.01)

(58) Field of Classification Search
CPC .. B41J 2/17523; B41J 2/1754; B41J 2/17553; B41J 29/02; B41J 29/13
See application file for complete search history.

(56) References Cited

U.S. PATENT DOCUMENTS

| | | | | |
|---|---|---|---|---|
| 2018/0272723 | A1* | 9/2018 | Shinada | B41J 2/17509 |
| 2018/0311964 | A1 | 11/2018 | Tanaka | |

FOREIGN PATENT DOCUMENTS

| | | | |
|---|---|---|---|
| CN | 105966072 | A | 9/2016 |
| CN | 107107621 | A | 8/2017 |
| CN | 108790402 | A | 11/2018 |
| JP | 2018069705 | A | 5/2018 |

* cited by examiner

INKJET RECORDING APPARATUS AND INK TANK THAT PREVENTS INK DRIPPING WHEN INK IS INJECTED INTO AN INK TANK

CROSS-REFERENCE TO RELATED APPLICATIONS

This application is a continuation of U.S. patent application Ser. No. 17/384,192 filed Jul. 23, 2021, which is a continuation of U.S. patent application Ser. No. 16/829,651 filed Mar. 25, 2020, and issued as U.S. Pat. No. 11,097,547 on Aug. 24, 2021, which claims the benefit of Japanese Patent Application No. 2019-071350, filed Apr. 3, 2019, all of which are hereby incorporated by reference herein in their entirety.

BACKGROUND OF THE DISCLOSURE

Field of the Disclosure

The present disclosure relates to an inkjet recording apparatus that records an image by discharging ink, and an ink tank.

Description of the Related Art

The publication of Japanese Patent Application Laid-Open No. 2017-222152 discusses an ink tank in which an ink inlet is provided that allows ink to flow into an ink storage chamber. A user can supply ink from an ink supply container to the ink tank through the ink inlet. When ink is supplied, ink may drip near the ink inlet. Thus, an absorber capable of absorbing ink is provided on the top surface of the ink tank, whereby it is possible to prevent contamination due to ink drips.

In the configuration of the publication of Japanese Patent Application Laid-Open No. 2017-222152, however, there is a limitation on the amount of ink that can be absorbed by the absorber. Thus, it may not be possible to absorb ink exceeding a predetermined amount and prevent contamination due to ink drips.

SUMMARY OF THE DISCLOSURE

The present disclosure is directed to providing an inkjet recording apparatus that prevents ink dripping when ink is injected into an ink tank from contaminating the surroundings of the ink tank.

According to an aspect of the present disclosure, an inkjet recording apparatus includes an ink tank including an ink storage chamber configured to store ink to be supplied to a recording head configured to discharge ink, and an injection portion through which ink is injected from an ink bottle into the ink storage chamber, an ink reception portion configured to receive ink inside the injection portion, a communication portion configured to communicate with the ink storage chamber inside the injection portion, and a guide portion configured to guide ink received by the ink reception portion to the communication portion.

Further features and aspects of the present disclosure will become apparent from the following description of example embodiments with reference to the attached drawings.

DESCRIPTION OF THE EMBODIMENTS

Numerous example embodiments and features of the present disclosure will be described below with reference to the accompanying drawings. The following example embodiments, however, do not limit the present disclosure, and not all the combinations of the features described in the present example embodiments are essential for a method for solving the problems in the present disclosure. The relative arrangement and the shapes of the components described in the example embodiments are merely illustrative, and do not limit the scope of the disclosure to them only.

Example Configuration of Apparatus

Figure 1A:
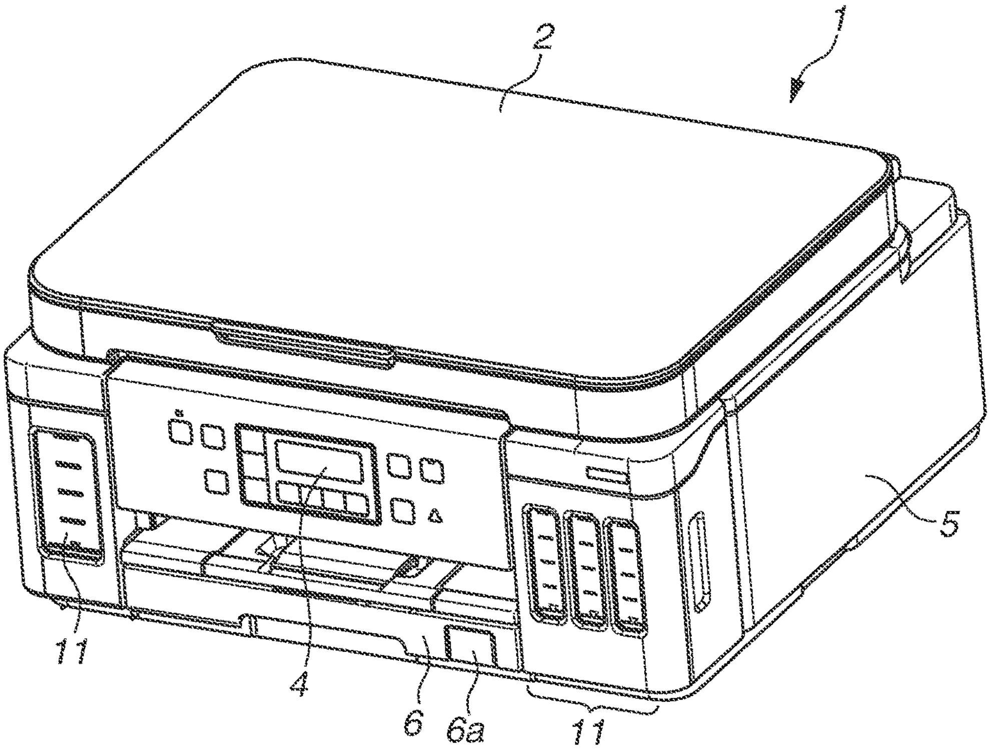
FIGS. 1A and 1B are external perspective views of an inkjet recording apparatus according to a first example embodiment.

A first example embodiment of the present disclosure will be described below. FIG. 1A is an external perspective view illustrating an inkjet recording apparatus (hereinafter, "recording apparatus") 1 according to the present example embodiment. The recording apparatus 1 includes a housing 5, a recording head 3 (see FIG. 2) that performs a recording operation on a recording medium, and an ink tank 11 as an ink storage container that stores ink to be supplied to the recording head 3. In the present example embodiment, the ink tank 11 is disposed on the front surface of the housing 5 and fixed to the apparatus main body. Similarly, on the front surface of the housing 5, an operation unit 4 is included that allows a user to perform an operation, such as inputting an instruction, on the recording apparatus 1. The operation unit 4 according to the present example embodiment also includes a display panel capable of displaying an error in the recording apparatus 1.

On the front surface of the housing 5, a sheet feeding cassette 6 is provided that is insertable into and removable from the housing 5 by the user. In the sheet feeding cassette 6, a window portion 6*a* is provided so that the user can visually confirm recording media stacked within the sheet feeding cassette 6. It is desirable that the window portion 6*a* should be made of a transparent member, such as glass or plastic.

Figure 1B:
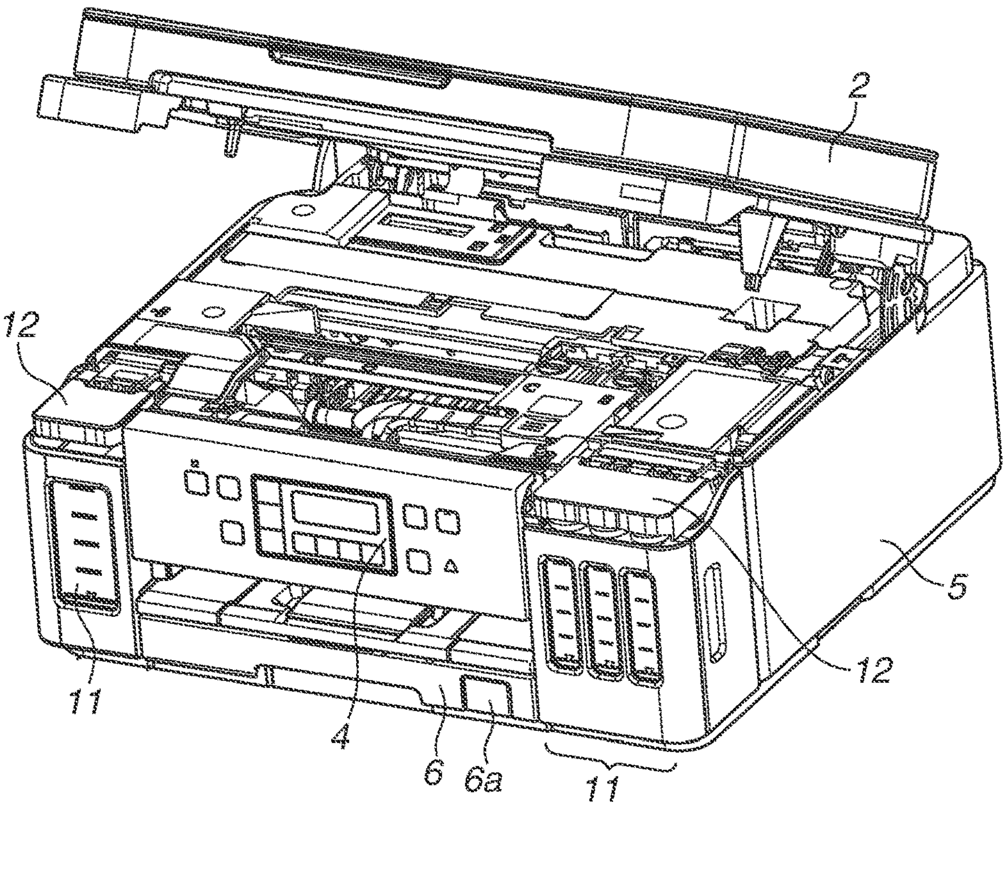

Above the housing 5, a scanner unit 2 that performs a reading operation for reading a document is provided to be openable and closable relative to the housing 5. FIG. 1B is an external perspective view of the recording apparatus 1, illustrating the state where the scanner unit 2 is opened relative to the housing 5. If the scanner unit 2 is opened, a tank cover 12 capable of covering the upper surface of the ink tank 11 is exposed. In FIG. 1B, the tank cover 12 is in a closed state. The details of the tank cover 12 will be described below. A configuration may also be employed in which a main body cover on which the scanner unit 2 is not mounted is openable and closable relative to the housing 5.

Figure 2:
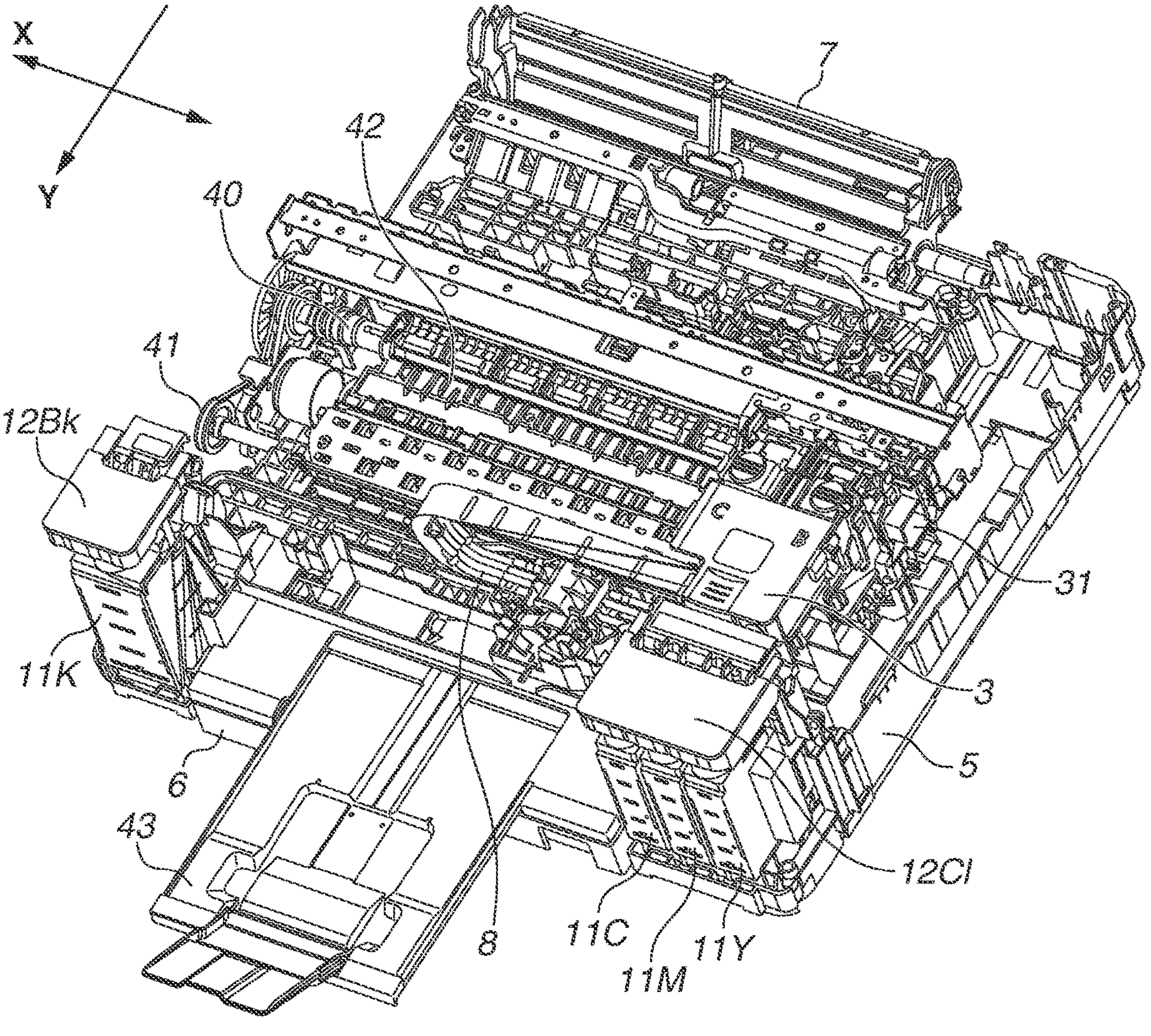
FIG. 2 is a perspective view illustrating an internal configuration of the inkjet recording apparatus according to the first example embodiment.

FIG. 2 is a perspective view illustrating the internal configuration of the recording apparatus 1. The recording apparatus 1 causes a feeding unit (not illustrated) to feed a recording medium stacked in the sheet feeding cassette 6 provided on the front surface of the housing 5 or a sheet feeding tray 7 provided on the back surface of the housing 5. The recording medium fed by the feeding unit is conveyed by a conveying roller (conveying unit) 40 onto a platen 42 disposed at a position facing the recording head 3. The platen 42 is a member for guiding and supporting the recording medium on which recording is to be performed by the recording head 3. The recording medium for which the recording by the recording head 3 is completed is discharged by a discharge roller (discharge unit) 41 onto a sheet discharge tray (discharge unit) 43. The sheet discharge tray 43 is disposed above the sheet feeding cassette 6.

The direction in which the recording medium is conveyed by the conveying roller 40 (Y-direction illustrated in FIG. 2) is referred to as a "conveying direction". That is, the upstream side in the conveying direction corresponds to the back surface side of the housing 5, and the downstream side in the conveying direction corresponds to the front surface side of the housing 5.

The recording head 3 is mounted on a carriage 31 that moves back and forth in a main scanning direction intersecting the conveying direction (X-direction illustrated in FIG. 2). In the present example embodiment, the conveying direction and the main scanning direction are orthogonal to each other.

The recording head 3 discharges ink droplets while moving with the carriage 31 in the main scanning direction, thereby recording an image for one band on the recording medium (a recording operation). If the image for one band is recorded, the recording medium is conveyed by a predetermined amount in the conveying direction by the conveying roller 40 (an intermittent conveying operation). The recording operation for one band and the intermittent conveying operation are repeated, thereby recording an image on the entirety of the recording medium based on image data.

In the recording apparatus 1, a maintenance unit is provided within the scanning region of the carriage 31 and outside the recording region where the recording head 3 performs the recording operation. The maintenance unit is a unit that performs a maintenance process for maintaining the discharge performance of the recording head 3. The maintenance unit is disposed at a position opposable to a discharge port surface on which ink discharge ports are arranged. The recording head 3 illustrated in FIG. 2 is located at the position where the maintenance unit can perform the maintenance process (a home position). The maintenance unit includes a cap capable of capping the discharge port surface, and a suction recovery mechanism that performs a suction operation for forcibly suctioning ink in the state where the discharge port surface is capped, thus removing remaining air bubbles or thickened ink in the discharge ports.

The present example embodiment illustrates an example of a serial head in which the recording head 3 is mounted on the carriage 31. The present disclosure, however, is not limited to this, and is also applicable to a line head in which a plurality of discharge ports is arranged in a region corresponding to the width of the recording medium.

The ink tank 11 is provided in the recording apparatus 1 for each color of ink to be discharged by the recording head 3. In the present example embodiment, four ink tanks, namely, a black ink tank 11K, a cyan ink tank 11C, a magenta ink tank 11M, and a yellow ink tank 11Y, are included. These ink tanks are collectively referred to as the "ink tank 11". Cyan, magenta, and yellow are merely examples of color inks, and the color inks are not limited to these.

As illustrated in FIG. 2, the black ink tank 11K is disposed on the left side of the sheet discharge tray 43 and the sheet feeding cassette 6 when viewed from the front of the recording apparatus 1. The cyan ink tank 11C, the magenta ink tank 11M, and the yellow ink tank 11Y are disposed on the right side of the sheet discharge tray 43 and the sheet feeding cassette 6 when viewed from the front of the recording apparatus 1. That is, the sheet discharge tray 43 and the sheet feeding cassette 6 are provided between the black ink tank 11K and the color ink tanks. The ink tank 11 is connected to the recording head 3 by a flexible tube 8 that forms a supply flow path for supplying ink to the recording head 3.

In the recording apparatus 1, a black tank cover 12Bk and a color tank cover 12C1 are provided. The black tank cover 12Bk covers the upper surface of the black ink tank 11K. The color tank cover 12C1 integrally covers the upper surfaces of the cyan ink tank 11C, the magenta ink tank 11M, and the yellow ink tank 11Y. Hereinafter, the black tank cover 12Bk and the color tank cover 12C1 will be collectively referred to as the "tank cover 12".

The present example embodiment illustrates a form in which ink is supplied from the ink tank 11 to the recording head 3 by the tube 8. The present disclosure, however, is not limited to this, and is also applicable to the form of on-carriage, in which the ink tank 11 is mounted together with the recording head 3 on the carriage 31.

Example Ink Injection Operation

FIGS. 3A to 3D are external perspective views of a tank unit 10 including the ink tank 11 and peripheral components of the ink tank 11. The basic configuration of the tank unit 10 is common to all the ink colors and therefore is described using a black tank unit as an example.

Figure 3A:
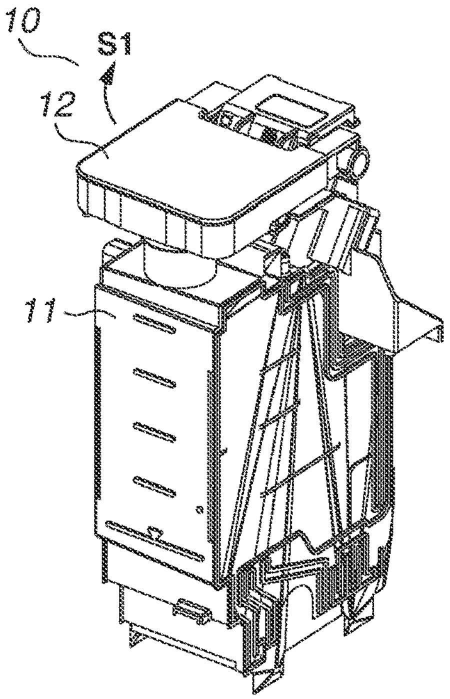
FIGS. 3A, 3B, 3C, and 3D are external perspective views of a tank unit according to the first example embodiment.
Figure 3B:
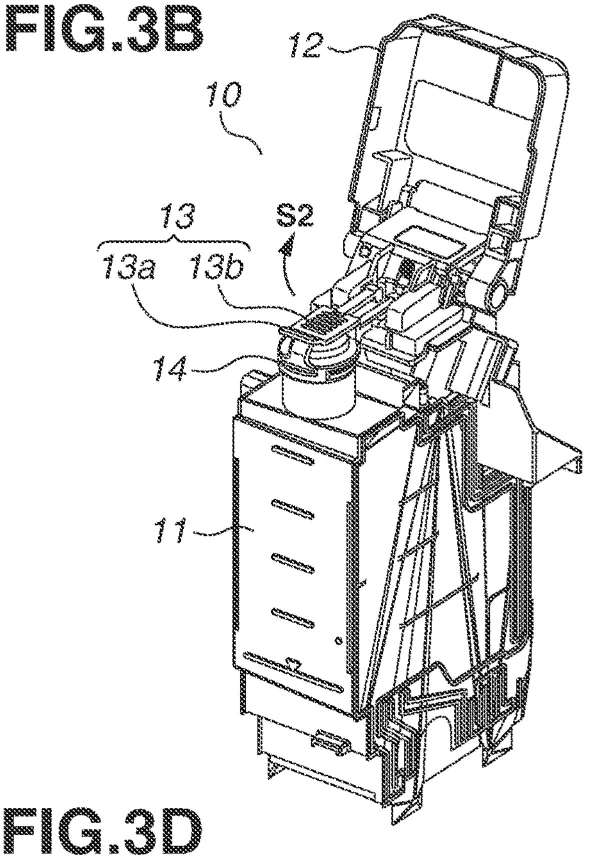
Figure 3C:
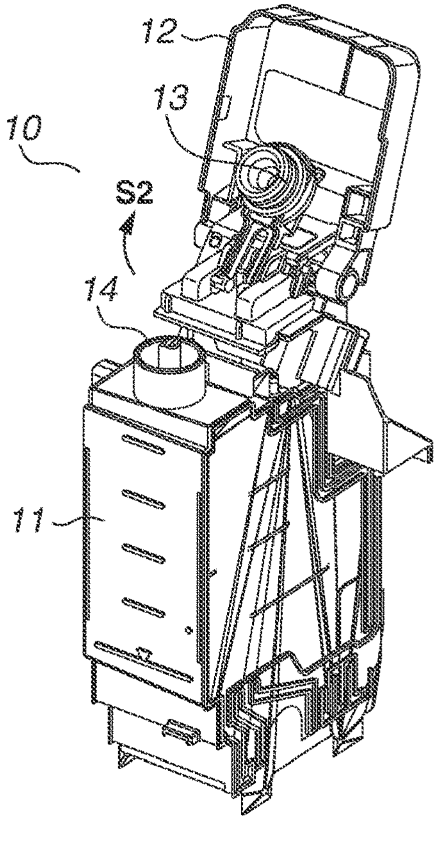

FIG. 3A illustrates the state where the tank cover 12 is closed. FIG. 3B illustrates the state where the tank cover 12 is opened. The user opens the tank cover 12 in a direction S1, and thus the user can access a tank cap 13.

An injection portion 14 for injecting ink is provided on the upper surface of the ink tank 11. The injection portion 14 can be sealed by the tank cap 13. The tank cap 13 includes a cap portion 13*a* for sealing the injection portion 14, and a lever portion 13*b* that supports the cap portion 13*a* and can be operated by the user. The lever portion 13*b* is axially supported to be pivotable relative to the main body of the recording apparatus 1. The user removes the cap portion 13*a* from the injection portion 14 while pivoting the lever portion 13*b* in a direction S2 illustrated in FIG. 3B, and thereby can inject ink (see FIG. 3C). The lever portion 13*b* may also be configured to be axially supported to be pivotable relative to the ink tank 11 or the tank cover 12.

The cap portion 13*a* of the tank cap 13 includes a member having rubber elasticity. The lever portion 13*b* is made of, for example, plastic. The lever portion 13*b* according to the present example embodiment is color-coded with a color corresponding to the color of ink stored in the ink tank 11. More specifically, the black ink lever portion 13*b* is color-coded in black or gray. The cyan ink lever portion 13*b* is color-coded in cyan. The magenta ink lever portion 13*b* is color-coded in magenta. The yellow ink lever portion 13*b* is color-coded in yellow. This can prevent the user from injecting ink of the wrong color when the user injects ink into the ink tank 11. A form may also be employed in which not only the lever portion 13*b* but also the cap portion 13*a* is color-coded.

Figure 3D:
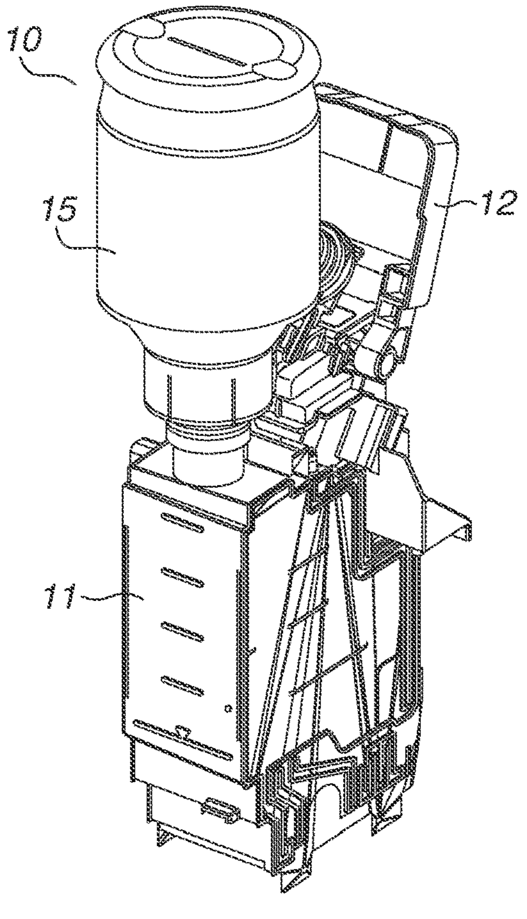

FIG. 3D illustrates the state where with the tank cap 13 removed, an ink bottle 15 that is an ink replenishing container is inserted into the injection portion 14, and ink is injected. In the present example embodiment, ink in the ink bottle 15 is subjected to gas-liquid exchange with air in the ink tank 11, thus being injected into the ink tank 11.

Example Configuration of Ink Tank

Figure 4A:
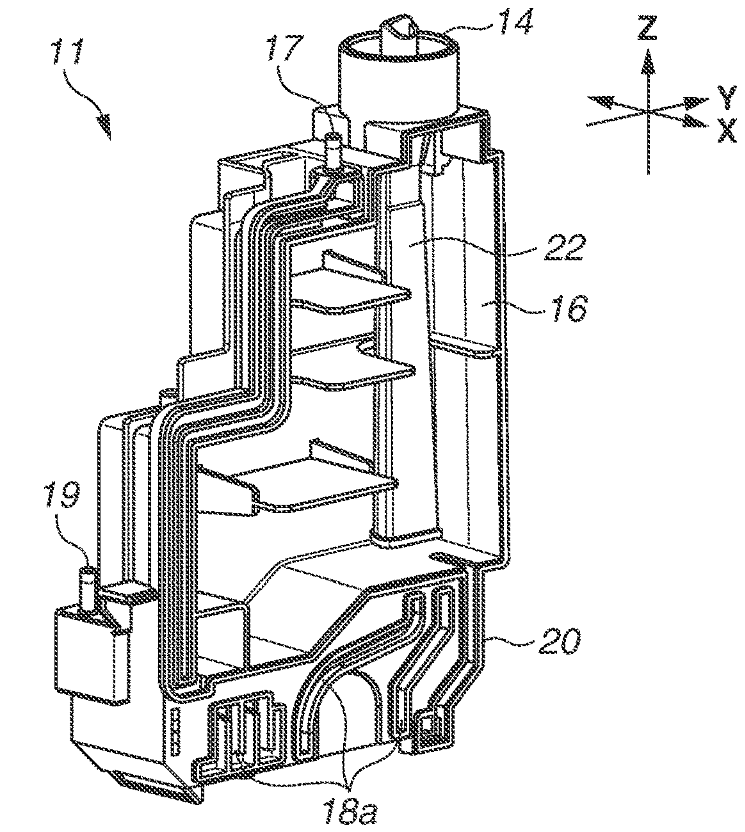
FIGS. 4A and 4B are perspective views of an ink tank according to the first example embodiment.
Figure 4B:
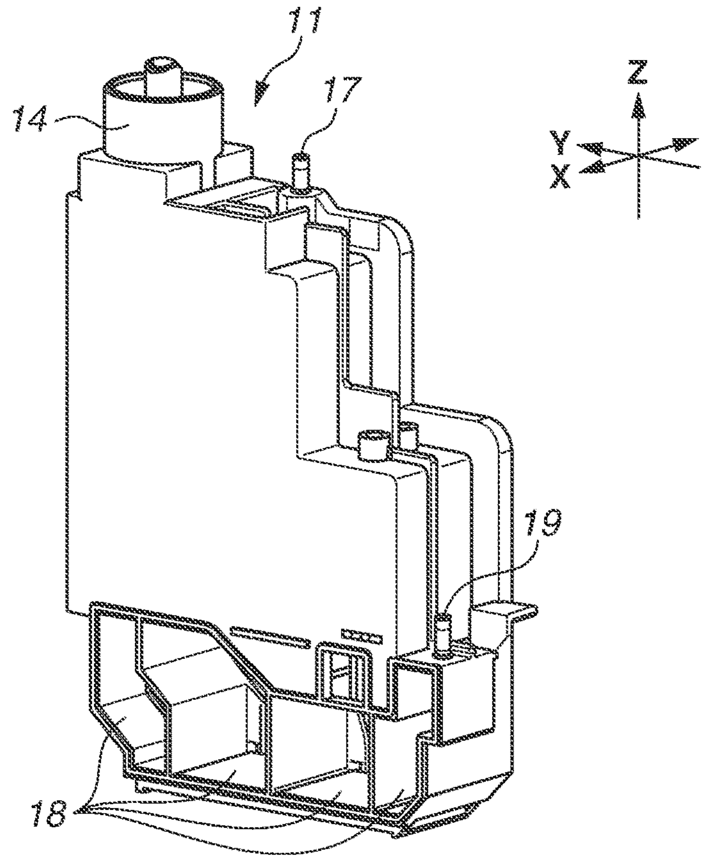

FIGS. 4A and 4B are perspective views of the ink tank 11. The ink tank 11 includes an ink storage chamber 16 that stores ink, an ink supply port 17 for supplying ink in the ink storage chamber 16 to the recording head 3, an air storage chamber 18 that stores air, and an atmosphere communication port 19 that causes the air storage chamber 18 to communicate with atmosphere. The ink storage chamber 16 is disposed in an upper portion of the ink tank 11 and provided opening to a first side surface side. FIG. 4A is a perspective view of the ink tank 11 when viewed from the first side surface side. One end of the ink supply port 17 is connected to the ink storage chamber 16, and the other end is connected to the tube 8 (see FIG. 2). The opening of the ink storage chamber 16 on the first side surface side is closed by a flexible film (not illustrated), whereby the ink storage chamber 16 can store ink.

The air storage chamber 18 is disposed below the ink storage chamber 16 and provided opening to a second side surface side facing the first side surface. FIG. 4B is a perspective view of the ink tank 11 when viewed from the second side surface side. The air storage chamber 18 on the second side surface side is partitioned into a plurality of rooms, and the rooms communicate with each other through communication flow paths 18*a* disposed on the first side surface side. The second side surface side on which the air storage chamber 18 opens is also closed by a flexible film (not illustrated). The rooms of the air storage chamber 18 do not communicate with each other on the second side surface side, but communicate with each other through the communication flow paths 18*a* disposed on the first side surface side.

The air storage chamber 18 and the ink storage chamber 16 are connected together with a connection path 20 that extends downward from the lower surface of the ink storage chamber 16. The lower end of the connection path 20 is a gas-liquid exchange portion between ink and air. The connection path 20 is disposed on the first side surface side of the ink tank 11. The gas-liquid exchange portion of the connection path 20 has such a cross-sectional area as to maintain the meniscus of ink. On an upper side of the air storage chamber 18, the atmosphere communication port 19 is provided that communicates with atmosphere. The atmosphere communication port 19 and the connection path 20 are placed away from each other.

In normal use, ink is supplied from the ink storage chamber 16 to the recording head 3 with the discharge of ink from the recording head 3, and the same volume of air as the supplied ink is supplied from the air storage chamber 18 to the ink storage chamber 16 through the gas-liquid exchange portion. If, however, air in the ink storage chamber 16 expands due to fluctuations in air temperature or atmospheric pressure, and the meniscus of the gas-liquid exchange portion is destroyed, ink in the ink storage chamber 16 drops into the air storage chamber 18 by a hydraulic head difference. Thus, the air storage chamber 18 has a volume capable of storing ink filling up the ink storage chamber 16. As described above, the air storage chamber 18 also functions as a buffer chamber that prevents ink from leaking from the atmosphere communication port 19 into the apparatus.

Even if the recording apparatus 1 is brought into an orientation different from that in normal use in the state where ink is stored in the air storage chamber 18, since the atmosphere communication port 19 and the connection path 20 are placed away from each other, ink is prevented from leaking from the atmosphere communication port 19. Between the connection path 20 and the atmosphere communication port 19, the air storage chamber 18 is partitioned into a plurality of rooms and therefore impedes the flow of ink. This has the effect of further preventing the leakage of ink. Further, the side surface on which the partitioned air storage chamber 18 opens and the side surface on which the communication flow paths 18*a* are provided are different from each other. This results in a configuration in which ink is unlikely to come and go between adjacent partitioned rooms. This prevents ink from leaking from the atmosphere communication port 19.

Example Configuration of Needle

Figure 5:
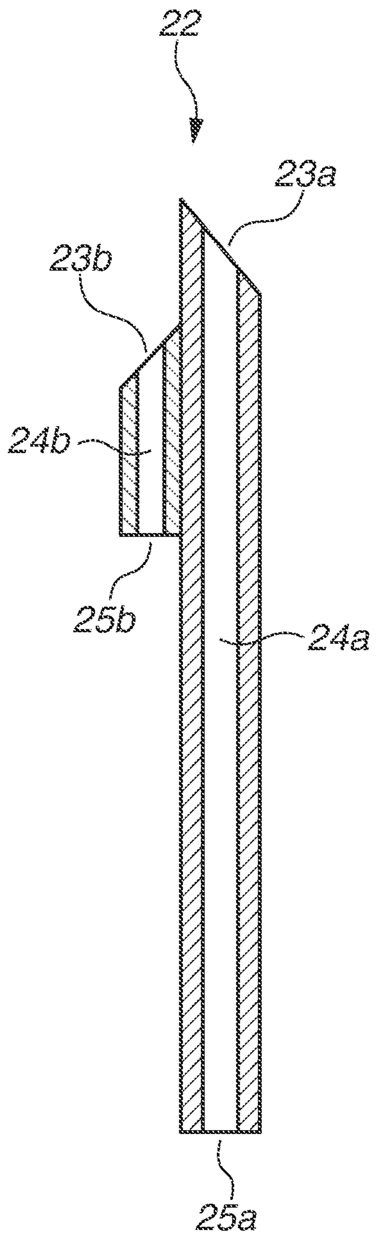
FIG. 5 is a schematic cross-sectional view illustrating details of a needle according to the first example embodiment.

A needle 22 is further provided in the ink tank 11 as an injection assistance member that assists the injection of ink. FIG. 5 is a schematic cross-sectional view illustrating details of the needle 22 according to the present example embodiment. The needle 22 includes a first flow path 24*a* and a second flow path 24*b* shorter than the first flow path 24*a*. The needle 22 causes the inside and outside of the ink tank 11 to communicate with each other. In the present example embodiment, the cross-sectional area of the first flow path 24*a* is configured to be greater than the cross-sectional area of the second flow path 24*b*.

The first flow path 24*a* is defined by a first upper end portion 23*a* that is exposed above the upper end of the injection portion 14 and opens to the outside of the ink tank 11, and a first lower end portion 25*a* that opens to the inside of the ink tank 11 (the ink storage chamber 16). The second flow path 24*b* is defined by a second upper end portion 23*b* that is exposed from the injection portion 14 and opens to the outside of the ink tank 11, and a second lower end portion 25*b* that opens to the inside of the ink tank 11 (the ink storage chamber 16).

The first upper end portion 23*a* of the first flow path 24*a* is formed high in the direction of gravity so as to protrude above the second upper end portion 23*b* of the second flow path 24*b*. Both the first upper end portion 23*a* and the second upper end portion 23*b* open obliquely to the directions in which the flow paths extend, and have sloping surfaces that become higher toward a center portion where the flow paths are in contact with each other. Further, the first lower end portion 25*a* is formed low in the direction of gravity so as to protrude below the second lower end portion 25*b*. That is, the distance between the first lower end portion 25*a* and the bottom surface of the ink storage chamber 16 is smaller than the distance between the second lower end portion 25*b* and the bottom surface of the ink storage chamber 16.

Figures 6A, 6B, 6C:
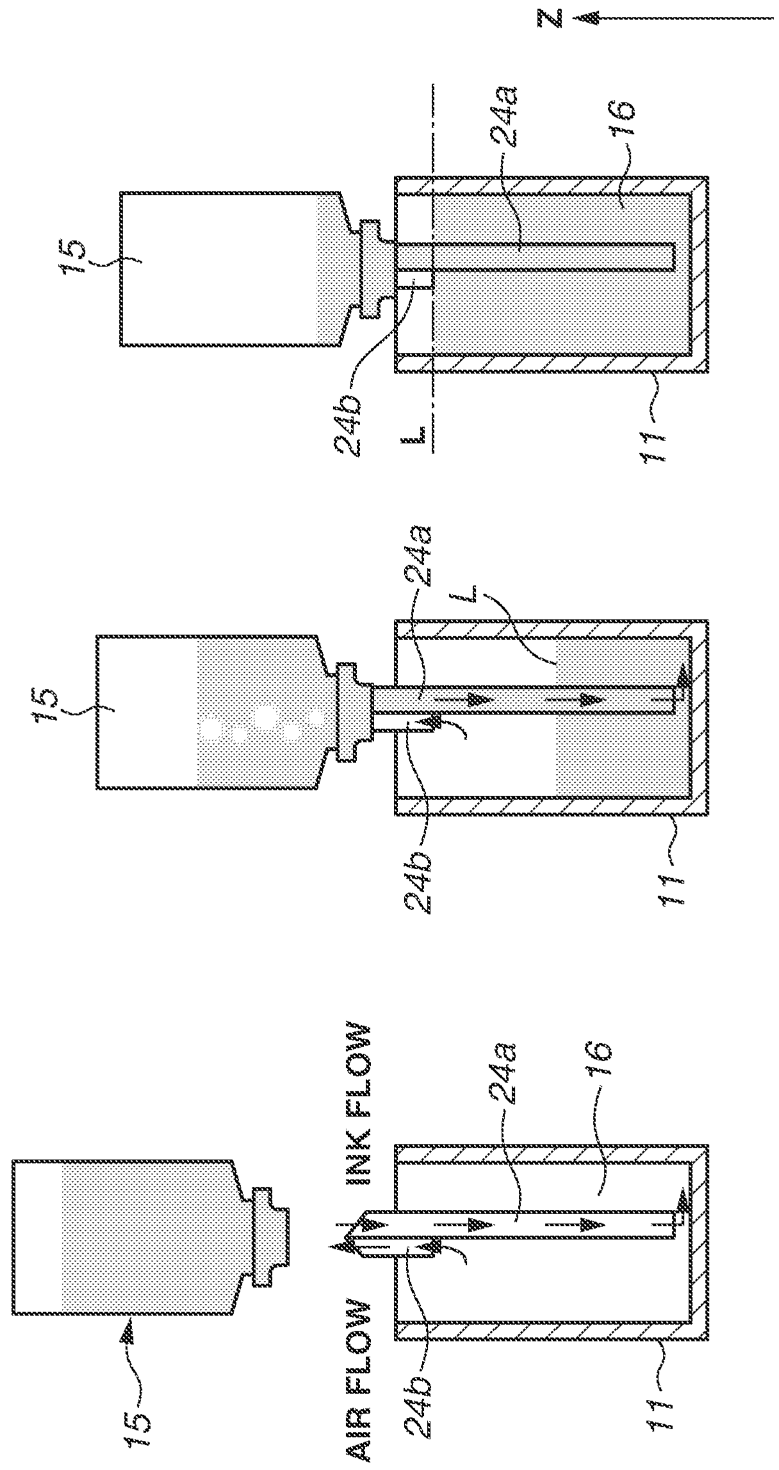
FIGS. 6A, 6B, and 6C are schematic diagrams illustrating an ink injection operation.

FIGS. 6A, 6B, and 6C are schematic diagrams illustrating an ink injection operation using gas-liquid exchange according to the present example embodiment. FIG. 6A illustrates the state where the ink tank 11 is empty. In the ink injection operation, one of the first flow path 24*a* and the second flow path 24*b* forming the needle 22 functions as the flow path of ink, and the other functions as the flow path of air. The opening of the ink bottle 15 is closed by a sealing member (not illustrated). The ink bottle 15 is configured so that even if the opening is directed downward as illustrated in FIG. 6A, ink does not drip.

If the ink bottle 15 is inserted into the ink tank 11, the needle 22 opens the sealing member of the ink bottle 15 as illustrated in FIG. 6B. Accordingly, ink in the ink bottle 15 flows through the first flow path 24*a* into the ink tank 11, and air in the ink tank 11 flows through the second flow path 24*b* into the ink bottle 15. That is, the first flow path 24*a* functions as the flow path of ink, and the second flow path 24*b* functions as the flow path of air. In this way, ink is injected into the ink tank 11 using gas-liquid exchange in which ink and air come and go between the ink tank 11 and the ink bottle 15.

If an ink liquid level L reaches the second lower end portion 25*b* of the second flow path 24*b* that functions as the flow path of air, air cannot flow out through the second lower end portion 25*b* to the ink bottle 15, as illustrated in FIG. 6C. Thus, the gas-liquid exchange stops. In other words, the injection of ink from the ink bottle 15 into the ink tank 11 stops based on the position of the second lower end portion 25*b* when the ink bottle 15 is inserted into the ink tank 11. This is the principle of the ink injection operation using gas-liquid exchange.

Figure 7A:
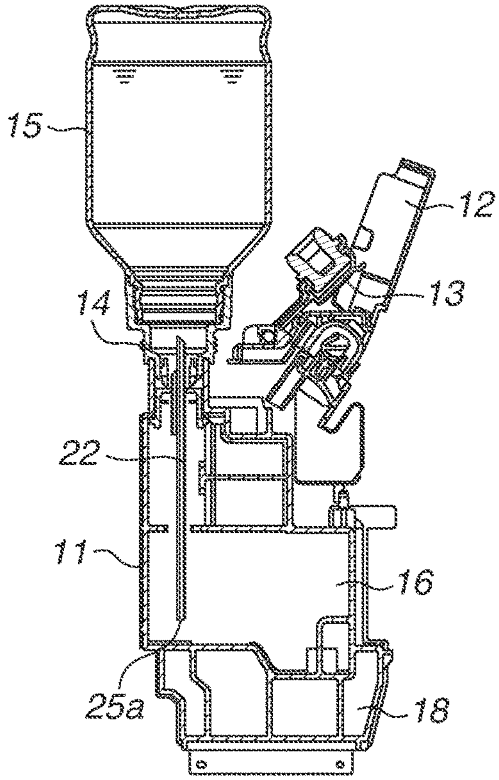
FIGS. 7A, 7B, and 7C are schematic sectional views illustrating features of the needle according to the first example embodiment.
Figure 7A:
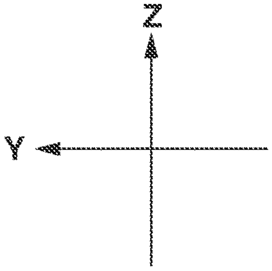
Figure 7B:
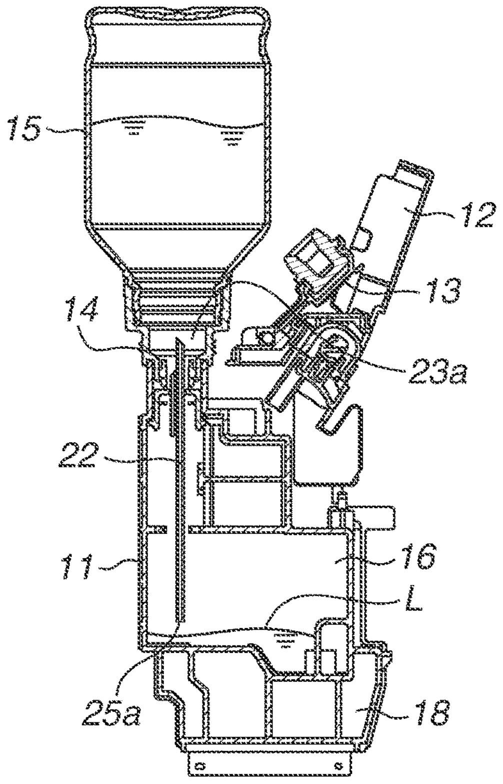
Figure 7C:
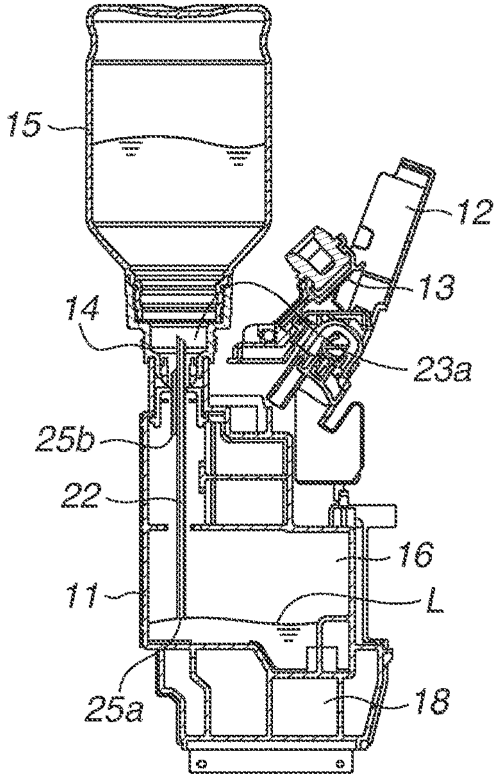

Referring now to FIGS. 7A, 7B, and 7C, the features of the needle 22 according to the present example embodiment will be described in detail. FIGS. 7A, 7B, and 7C are schematic sectional views illustrating the state where the user starts the ink injection operation. FIG. 7A illustrates the state immediately after the ink bottle 15 is inserted into the injection portion 14. When the needle 22 is inserted into the ink bottle 15, since the first upper end portion 23*a* of the first flow path 24*a* protrudes above the second upper end portion 23*b* of the second flow path 24*b*, the first flow path 24*a* comes into contact with ink stored in the ink bottle 15 first. Consequently, the needle 22 according to the present example embodiment is configured so that the first flow path 24*a* is likely to be settled as the flow path of ink.

FIG. 7B illustrates the state after the injection of ink from the ink bottle 15 into the ink tank 11 (the ink storage chamber 16) starts. The injection of ink using gas-liquid exchange is configured so that ink corresponding to air having flowed from the ink tank 11 into the ink bottle 15 flows from the ink bottle 15 into the ink tank 11. Thus, the more easily the air separates as air bubbles from the needle 22 in the configuration, the more smoothly the ink flows in. FIG. 7C illustrates a state in which the ink liquid level L in the ink tank 11 has reached the first lower end portion 25*a* of the first flow path 24*a*. When the ink liquid level L reaches the first lower end portion 25*a*, the first lower end portion 25*a* is closed by the ink, which disables inflow of air from the first lower end portion 25*a*.

Figure 8A:
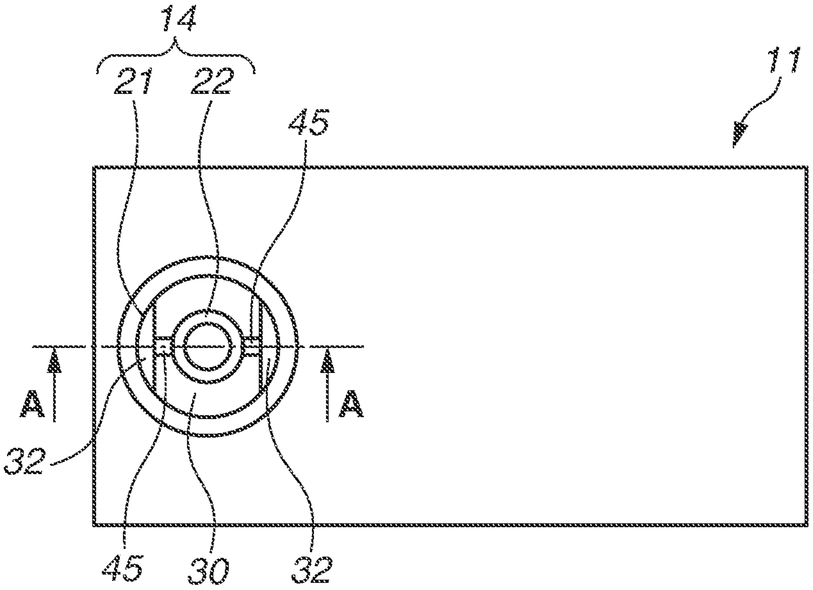
FIGS. 8A and 8B are diagrams illustrating a detailed configuration of an injection portion according to the first example embodiment.
Figure 8B:
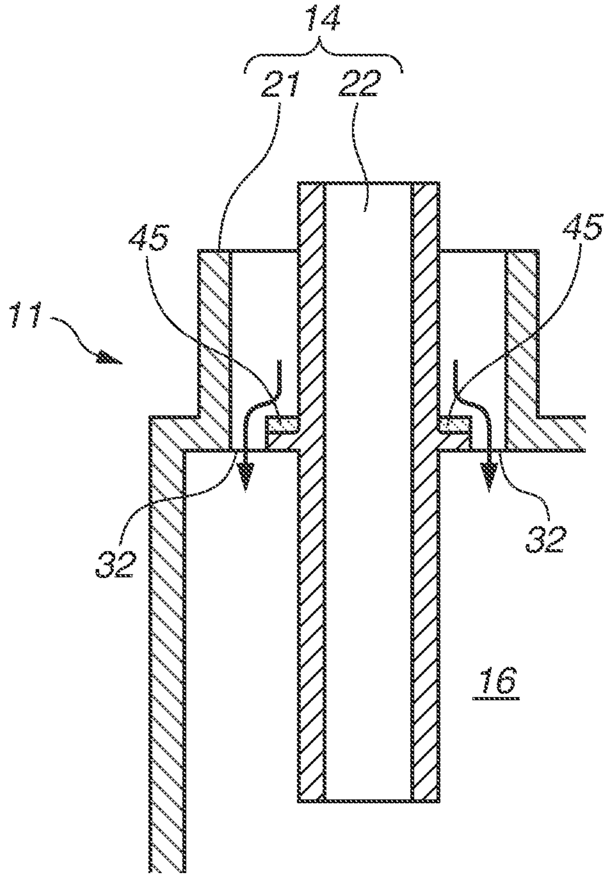

Referring now to FIGS. 8A and 8B, the detailed configuration of the injection portion 14 will be described. FIG. 8A is a schematic top view illustrating the ink tank 11 in a simplified manner. FIG. 8B is a schematic sectional view of the vicinity of the injection portion 14 from a direction A illustrated in FIG. 8A. The injection portion 14 includes a wall portion 21 that is formed integrally with the main body of the ink tank 11 and defines the opening of the injection portion 14, and the needle 22 inserted into a space surrounded by the wall portion 21. An ink reception portion 30 is provided that receives ink between the needle 22 and the wall portion 21. In the present example embodiment, the ink reception portion 30 is formed integrally with the ink tank 11.

The ink reception portion 30 partially covers the opening surrounded by the wall portion 21, and the parts that are not covered by the ink reception portion 30 function as communication portions 32 that communicate with the ink storage chamber 16. The ink reception portion 30 is further provided with guide portions 45 are provided that guide ink from the needle 22 to the communication portions 32.

The guide portions 45 according to the present example embodiment have groove shapes lower than the periphery of the ink reception portion 30. Thus, not only ink dripping from the needle 22 but also ink received by the ink reception portion 30 is also guided to the communication portions 32 by the guide portions 45 with the capillary force of the groove shapes. Since the communication portions 32 communicate with the ink storage chamber 16, ink dripping to the outside of the needle 22 and received by the ink reception portion 30 when ink is injected drops through the communication portions 32 into the ink storage chamber 16, as indicated by arrows in FIG. 8B. Consequently, ink dripping when ink is injected can also be supplied to the recording head 3 and used in the recording operation of the recording head 3.

As described above, the injection portion 14 includes the ink reception portion 30 that receives ink, and the guide portions 45 are provided that guide ink to the communication portions 32 (the ink storage chamber 16) in the ink reception portion 30, whereby it is possible to prevent ink dripping when ink is injected from contaminating the surroundings.

In FIGS. 8A and 8B, two communication portions 32 and two guide portions 45 are provided. The present disclosure, however, is not limited to this. A form may also be employed in which a single communication portion 32 and a single guide portion 45 are provided, or three or more communication portions 32 and three or more guide portions 45 are provided.

Figure 9:
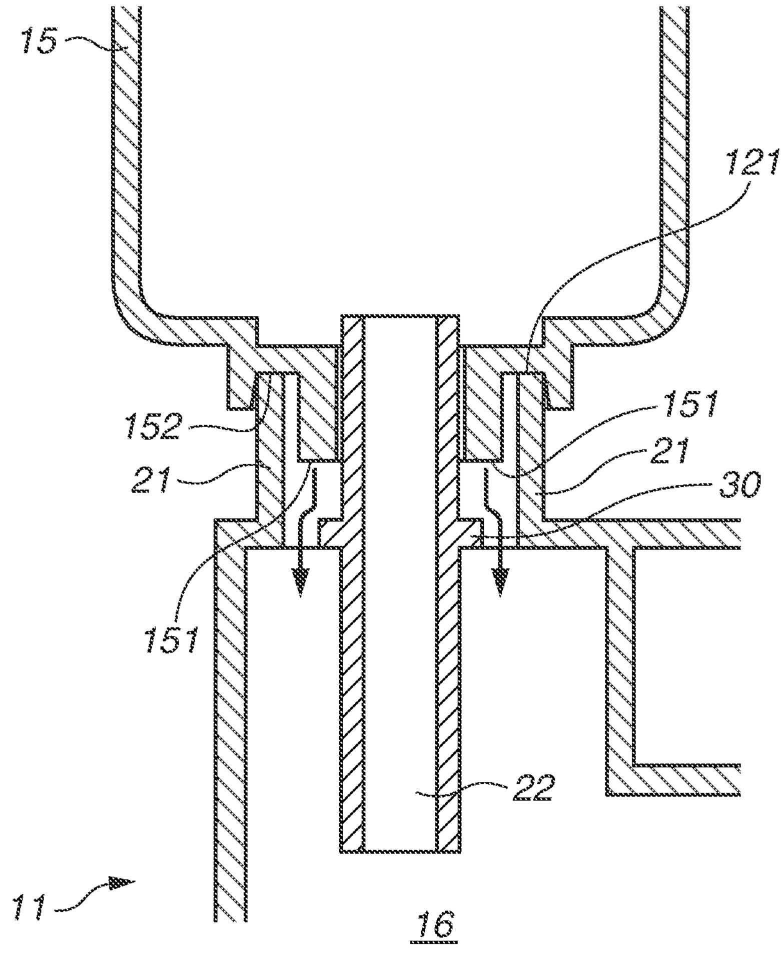
FIG. 9 is a schematic sectional view illustrating a state where ink is injected from an ink bottle through the injection portion according to the first example embodiment.

FIG. 9 is a schematic sectional view of the injection portion 14 and its surroundings when ink is injected from the ink bottle 15. When ink is injected, an end portion 151 protruding from the ink bottle 15 is inserted into the injection portion 14. With this insertion, the needle 22 is inserted into the end portion 151, and the needle 22 and the end portion 151 are engaged with each other, so that ink flows from the end portion 151 through the needle 22 into the ink storage chamber 16. At this time, a hitting surface 152 provided around the end portion 151 and an upper end 121 of the wall portion 21 are brought into contact, thus positioning the ink bottle 15 and the injection portion 14. In the present example embodiment, the hitting surface 152 is provided surrounding the end portion 151. A form may only need to be employed in which the hitting surface 152 is provided at a location different from that of the end portion 151.

In the state where the ink bottle 15 and the injection portion 14 are positioned, the end portion 151 and the ink reception portion 30 are separate with no contact with each other. In other words, the length (height) of the wall portion 21 of the injection portion 14 is configured to be longer than the length of the end portion 151 protruding from the hitting surface 152. This prevents ink received by the ink reception portion 30 from being attached to the end portion 151, and reduces the dripping of ink from the end portion 151 when the user separates the ink bottle 15 from the injection portion 14.

As described above, the ink bottle 15 and the injection portion 14 are positioned using the hitting surface 152 different from the needle 22 and the ink reception portion 30, so that it is also possible to reduce the dripping of ink from the ink bottle 15.

The present example embodiment illustrates a form in which the ink tank 11 is fixed to the recording apparatus 1, and ink is supplied by the tube 8. The present disclosure, however, is not limited to this, and is also applicable to the form of on-carriage, in which the ink tank 11 is mounted together with the recording head 3 on the carriage 31. More specifically, a form may also be employed in which an injection port and a needle are provided in an ink tank mounted on the carriage 31, and the user injects ink from an ink bottle.

Figure 10A:
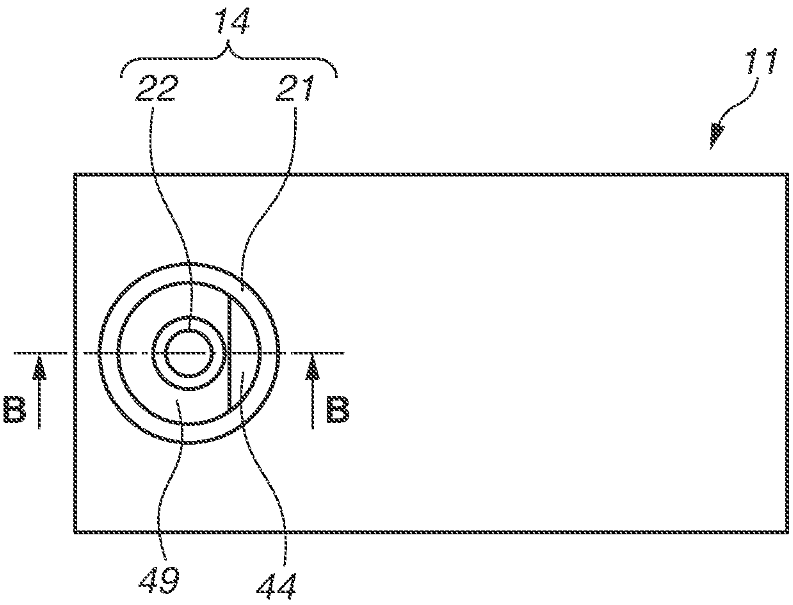
FIGS. 10A and 10B are diagrams illustrating a detailed configuration of an injection portion according to a second example embodiment.
Figure 10B:
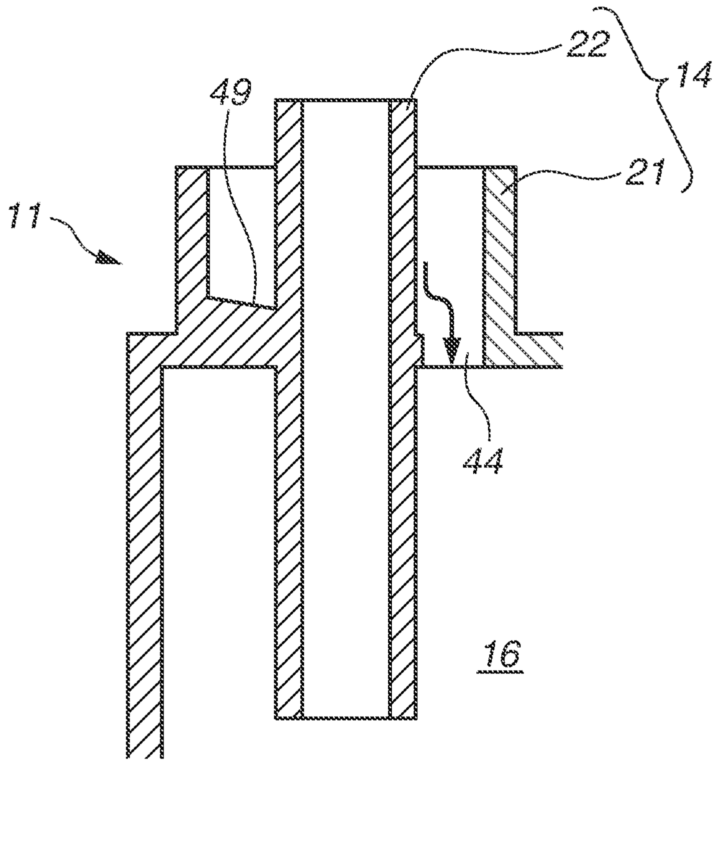

A second example embodiment of the present disclosure will be described below. Referring to FIGS. 10A, 10B, 11A, and 11B, the configuration of the injection portion 14 according to example embodiment will be described. FIG. 10A is a schematic top view illustrating the ink tank 11 in a simplified manner. FIG. 10B is a schematic cross-sectional view of the injection portion 14 and its surroundings when viewed from a direction B illustrated in FIG. 10A. As in the first example embodiment, the injection portion 14 includes the wall portion 21 and the needle 22.

Between the wall portion 21 and the needle 22, a sloping portion 49 as an ink reception portion and a communication portion 44 that communicates with the ink storage chamber 16 are provided. The sloping portion 49 slopes downward toward the communication portion 44. Thus, ink received by the sloping portion 49 is guided to the communication portion 44 along the slope and drops into the ink storage chamber 16. That is, the sloping portion 49 implements, with a single member, the functions of the ink reception portion 30 that receives ink and the guide portions 45 that guide ink in the first example embodiment.

Figure 11A:
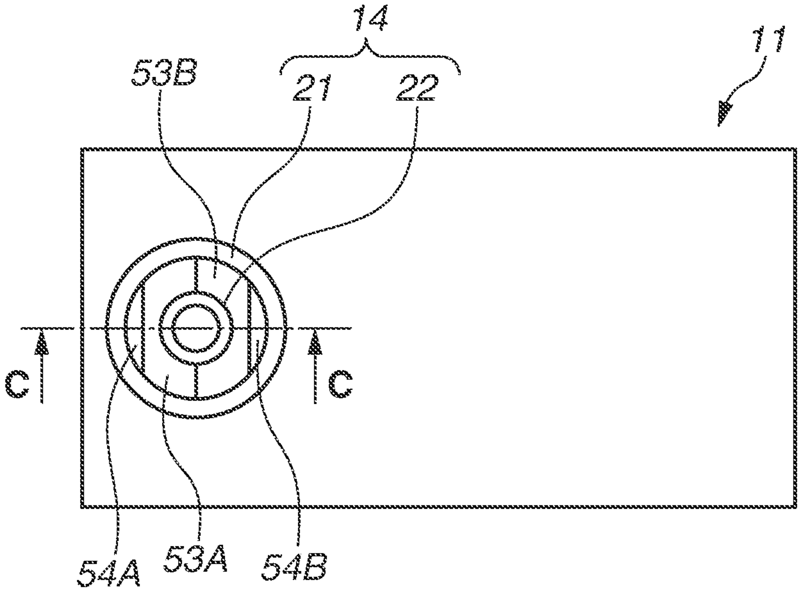
FIGS. 11A and 11B are diagrams illustrating a detailed configuration of an injection portion according to a variation of the second example embodiment.
Figure 11B:
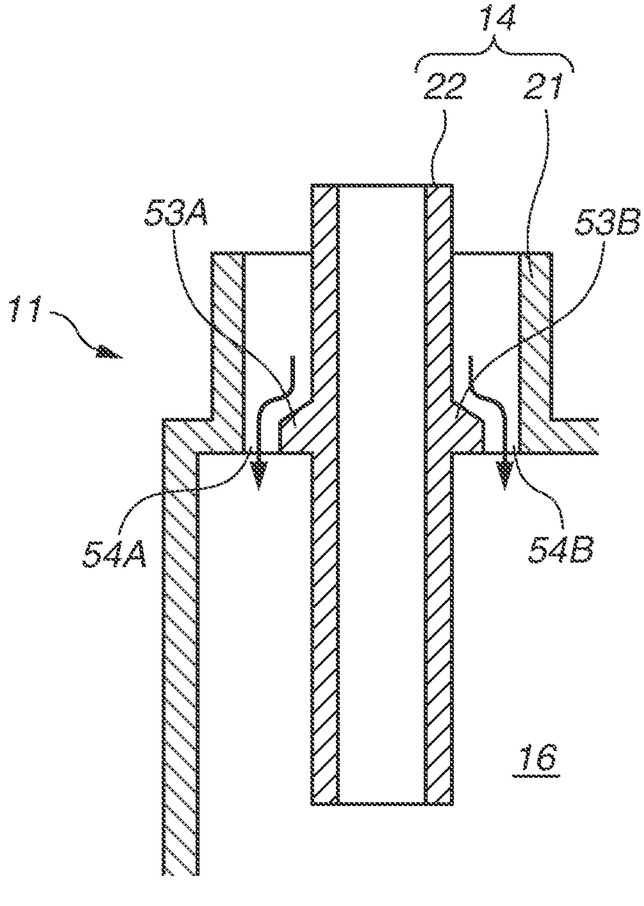

FIGS. 11A and 11B illustrate a variation of the second example embodiment. FIG. 11A is a schematic top view illustrating the ink tank 11 in a simplified manner. FIG. 11B is a schematic sectional view of the injection portion 14 and its surroundings from a direction C illustrated in FIG. 11A. In the variation, between the wall portion 21 and the needle 22, a first sloping portion 53A, a second sloping portion 53B, a first communication portion 54A, and a second communication portion 54B are provided.

The first sloping portion 53A slopes downward toward the first communication portion 54A. The second sloping portion 53B slopes downward toward the second communication portion 54B. As described above, even with a configuration including a plurality of sloping portions and communication portions, it is possible to prevent ink dripping from the ink bottle 15 from contaminating the surroundings, as in the first example embodiment.

Figure 12A:
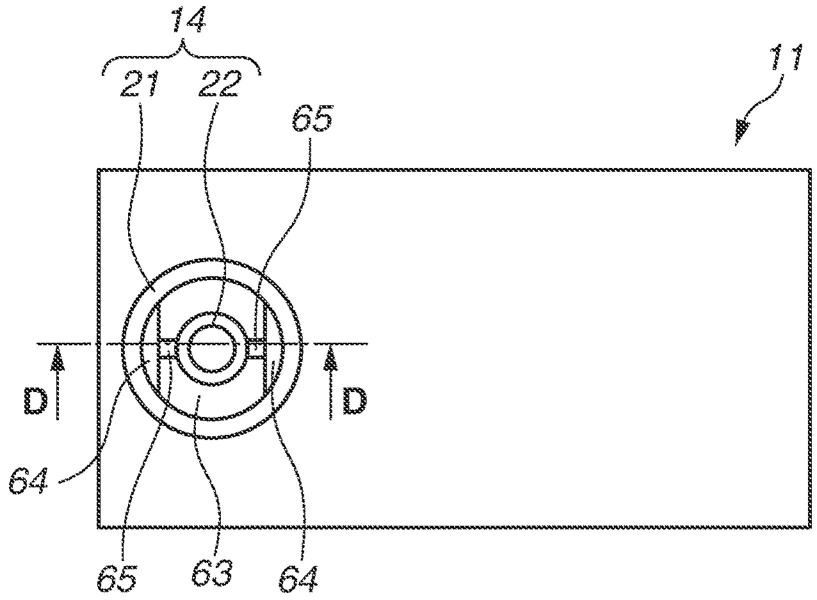
FIGS. 12A and 12B are diagrams illustrating a detailed configuration of an injection portion according to a third example embodiment.
Figure 12B:
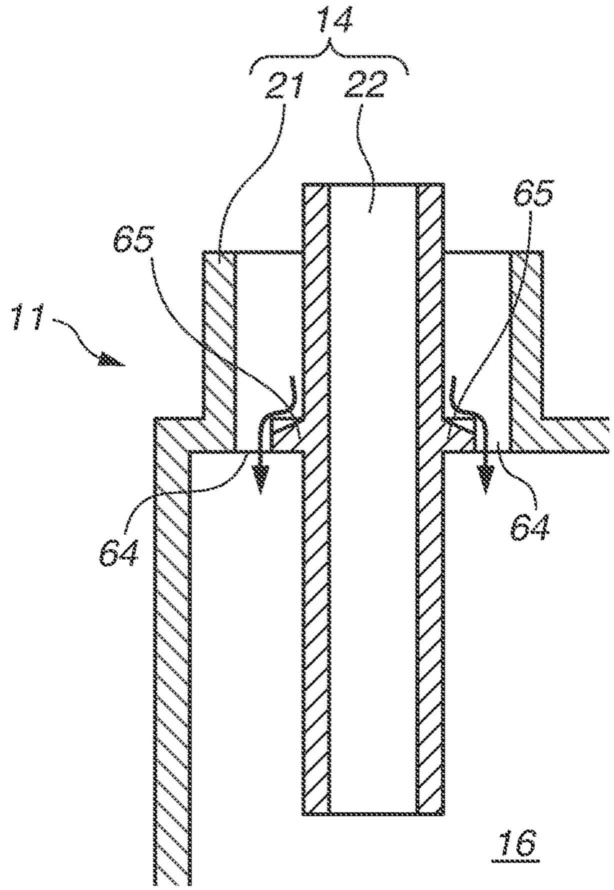

A third example embodiment of the present disclosure will be described below. The configuration of the injection portion 14 according to the present example embodiment will be described with reference to FIGS. 12A and 12B. FIG. 12A is a schematic top view illustrating the ink tank 11 in a simplified manner. FIG. 12B is a schematic sectional view of the injection portion 14 and its surroundings from a direction D illustrated in FIG. 12A. The injection portion 14 includes the wall portion 21 and the needle 22 as in the first example embodiment.

An ink reception portion 63 that receives ink, and communication portions 64 that communicate with the ink storage chamber 16 are provided between the wall portion 21 and the needle 22. In the ink reception portion 63, guide portions 65 are provided that have groove shapes sloping to guide ink to the communication portions 64. The guide portions 65 slope downward toward the communication portions 64. Thus, it is possible to guide ink to the ink storage chamber 16 more smoothly than the case with the guide portions 45 according to the first example embodiment. The numbers of communication portions 64 and guide portions 65 are not limited to two.

Figure 13A:
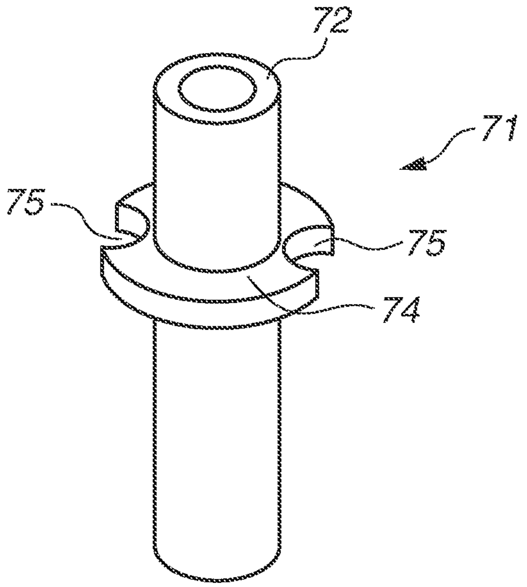
FIGS. 13A and 13B are diagrams illustrating a detailed configuration of an injection assistance member according to a fourth example embodiment.
Figure 13B:
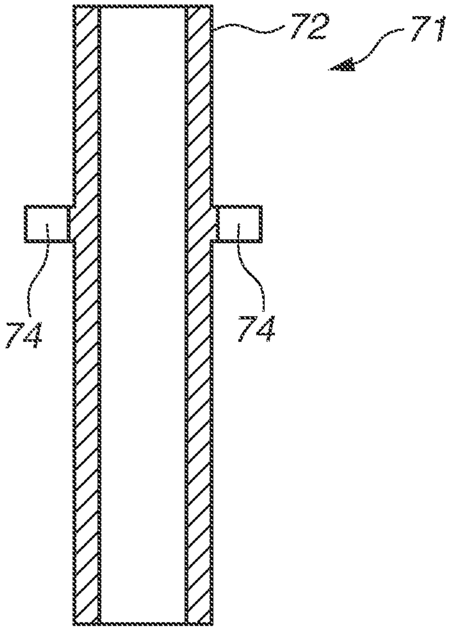

A fourth example embodiment of the present disclosure will be described below. The configuration of the injection portion 14 according to the present example embodiment is described with reference to FIGS. 13A, 13B, 14, and 15. FIG. 13A illustrates a schematic external perspective view of an injection assistance member 71. FIG. 13B illustrates a sectional view of the injection assistance member 71. In the present example embodiment, a needle portion 72 and an ink reception portion 74 are integrally formed. The needle portion 72 assists the injection of ink, and the ink reception portion 74 receives ink dripping to the outside of the needle portion 72 when ink is injected. In the ink reception portion 74, notch portions 75 are provided as communication portions that communicate with the ink storage chamber 16.

Figure 14:
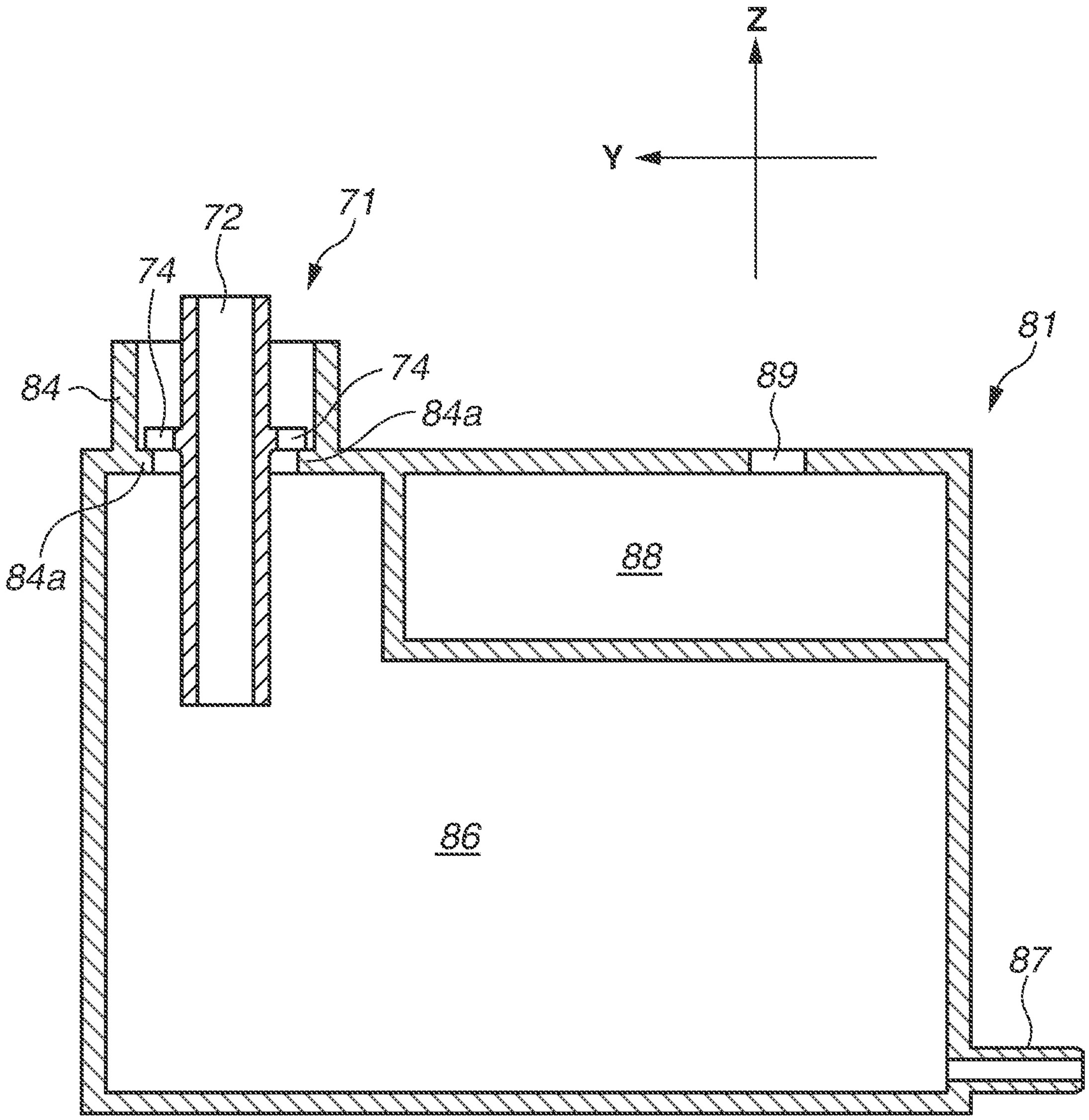
FIG. 14 is a diagram illustrating a detailed configuration of an ink tank according to the fourth example embodiment.

FIG. 14 illustrates a schematic sectional view of an ink tank 81 according to the fourth example embodiment. In the first example embodiment, the ink storage chamber that stores ink is placed above the air storage chamber that stores air, whereas the in fourth example embodiment, an ink storage chamber 86 is placed below an air storage chamber 88. In the ink tank 81, an ink supply port 87 for supplying ink in the ink storage chamber 86 to the recording head 3, and an atmosphere communication port 89 that causes the air storage chamber 88 to communicate with atmosphere are further provided. The ink storage chamber 86 and the air storage chamber 88 communicate with each other through a communication port (not illustrated). The ink tank 81 includes an injection portion 84 for injecting ink into the ink storage chamber 86.

In FIG. 14, the injection assistance member 71 is inserted into and attached to the injection portion 84. The ink reception portion 74 of the inserted injection assistance member 71 is brought into contact with an inner rib 84*a* protruding inside the injection portion 84, thus positioning the injection assistance member 71 relative to the injection portion 84. In the state where the injection assistance member 71 is positioned, the notch portions 75 is not in contact with the inner rib 84*a*, and therefore function as communication portions that communicate with the ink storage chamber 86. That is, ink received by the ink reception portion 74 drops through the notch portions 75 into the ink storage chamber 86.

Figure 15:
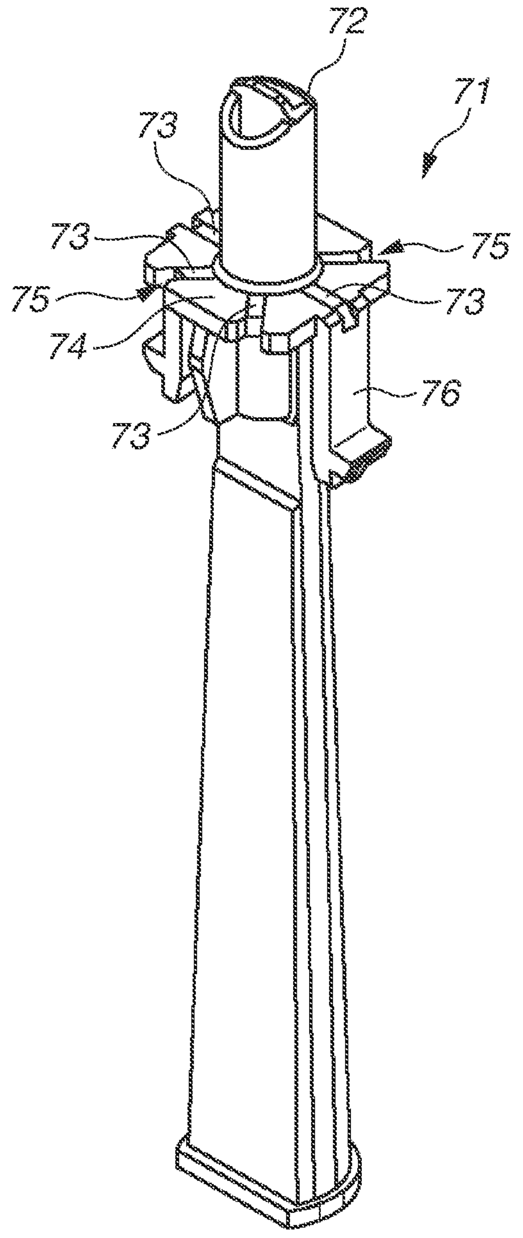
FIG. 15 is an external perspective view illustrating a variation of an injection assistance member according to the fourth example embodiment.

FIG. 15 is an external perspective view illustrating a variation of the injection assistance member 71 illustrated in FIGS. 13A and 13B. In the ink reception portion 74, guide portions 73 having groove shapes that guide ink to the notch portions 75 are provided as in the first example embodiment. Further, the injection assistance member 71 illustrated in FIG. 15 includes a hook portion 76 below the ink reception portion 74. The hook portion 76 is a flexible member having a hook shape. If the hook portion 76 is inserted into the injection portion 84, the hook portion 76 is brought into contact with the lower surface of the inner rib 84*a*. This prevents the injection assistance member 71 from detaching from the injection portion 84.

As described above, the needle portion 72 and the ink reception portion 74 are integrally formed, so that it is possible to realize the positioning of the injection assistance member 71 and the injection portion 84 with the ink reception portion 74. Consequently, it is possible to manufacture the ink tank 81 more easily than in a case where an ink reception portion is provided for an injection portion.

According to the present disclosure, it is possible to provide an inkjet recording apparatus that prevents ink dripping when ink is injected into an ink tank from contaminating the surroundings of the ink tank.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

What is claimed is:

1. A recording apparatus comprising:

a tank including a storage chamber configured to store ink to be supplied to a recording head configured to eject the ink and an opening for injecting the ink into the storage chamber, the opening being detachably capped by a tank cap;

a first flow path portion configured to flow the ink from a bottle to the storage chamber; and a receiving portion configured to partially cover the opening and receive the ink dripped from an outside of the first flow path portion, wherein the ink having dropped from the receiving portion is stored in the storage chamber, wherein the bottle is positioned with respect to the tank by a first portion of the bottle and a second portion of the tank being brought into contact, the first portion being different from an end portion of the bottle from which the ink flows out, and wherein, in a state where the bottle is positioned with respect to the tank, the end portion and the receiving portion are not in contact with each other.

2. The recording apparatus according to claim 1, wherein the second portion is a wall defining the opening through which the first flow path portion penetrates.

3. The recording apparatus according to claim 1, wherein the first portion is provided around the end portion.

4. The recording apparatus according to claim 1, further comprising:

a second flow path portion through which air flows from the storage chamber to the bottle.

5. The recording apparatus according to claim 4, wherein the first flow path portion and the second flow path portion are inserted into the bottle in a state where the ink flows from the bottle into the storage chamber.

6. The recording apparatus according to claim 4, wherein the receiving portion includes the first flow path portion and the second flow path portion.

7. The recording apparatus according to claim 1, wherein the recording head prints an image by discharging ink liquid.

8. A recording apparatus comprising:

a tank including a storage chamber configured to store ink to be supplied to a recording head configured to eject the ink and an opening for injecting the ink into the storage chamber, the opening being detachably capped by a tank cap; and a flow path member, inserted into the opening, including a first flow path portion configured to flow the ink from a bottle to the storage chamber and a hook portion configured to contact the inside of the tank.

9. The recording apparatus according to claim 8, wherein the flow path member includes a second flow path portion configured to flow air from the storage chamber to the bottle.

10. The recording apparatus according to claim 9, wherein an opening of the first flow path portion and an opening of the second flow path are detachably capped by the tank cap.

11. The recording apparatus according to claim 9, wherein a lower end of the second flow path portion defines an injectable liquid level.

12. The recording apparatus according to claim 11, wherein the hook portion is formed integrally with the second flow path portion.

13. The recording apparatus according to claim 8, wherein the flow path member includes a receiving portion configured to receive the ink dripped from an outside of the first flow path portion, and wherein the ink having dropped from the receiving portion is stored in the storage chamber.

14. The recording apparatus according to claim 13, wherein the receiving portion is capped by the tank cap.

15. The recording apparatus according to claim 8, wherein an opening of the first flow path portion is detachably capped by the tank cap.

16. The recording apparatus according to claim 8, wherein the first flow path portion is inserted into the bottle in a state where the ink flows from the bottle to the storage chamber.

17. The recording apparatus according to claim 8, wherein the recording head moves in a first direction.

18. The recording apparatus according to claim 8, further comprising:

a roller configured to convey a medium in a second direction.

19. The recording apparatus according to claim 8, further comprising:

a second tank including a second storage chamber configured to store ink to be supplied to the recording head.

20. The recording apparatus according to claim 19, wherein the tank and the second tank are provided along a first direction.

21. The recording apparatus according to claim 20, wherein the recording head moves in the first direction.

22. The recording apparatus according to claim 20, further comprising:

a roller configured to convey a medium in a second direction, the second direction crossing the first direction.

23. The recording apparatus according to claim 8, wherein the hook portion is formed integrally with the first flow path portion.

24. The recording apparatus according to claim 8, wherein a convex part of the hook portion contacts the inside of the tank.

* * * * *